United States Patent [19]

Krepel et al.

[11] Patent Number: 5,773,839
[45] Date of Patent: Jun. 30, 1998

[54] CASSETTE FOR USE IN AN ELECTRONIC RADIOGRAPHIC IMAGING SYSTEM

[75] Inventors: Kenneth J. Krepel, North St. Paul; Joseph A. Hoffman, Minneapolis; Anthony B. Ferguson, Lake Elmo, all of Minn.; Daniel J. Severson, St. Croix, Wis.; Keith K. McLaughlin, Eagan, Minn.; Walter S. Federation, Maplewood, Minn.; Wayne M. Wirth, North St. Paul, Minn.; Owen L. Nelson, St. Paul, Minn.; John E. Potts; James E. Steffen, both of Woodbury, Minn.

[73] Assignee: Imation Corp., Oakdale, Minn.

[21] Appl. No.: 512,596

[22] Filed: Aug. 18, 1995

Related U.S. Application Data

[63] Continuation of Ser. No. 220,899, Mar. 31, 1994, abandoned.

[51] Int. Cl.[6] .................................................. G01N 23/04
[52] U.S. Cl. ..................................... 250/580; 250/370.09
[58] Field of Search ............................. 250/370.09, 580, 250/591; 378/98.8

[56] References Cited

U.S. PATENT DOCUMENTS

| Re. 31,847 | 3/1985 | Luckey .................................... 250/337 |
|---|---|---|
| 3,650,620 | 3/1972 | Hoyt, III . |
| 3,827,072 | 7/1974 | Bevis et al. . |
| 3,898,722 | 8/1975 | Foote . |
| 4,126,788 | 11/1978 | Koontz et al. . |
| 4,176,275 | 11/1979 | Korn et al. ............................... 250/591 |
| 4,809,313 | 2/1989 | Gandolfo ................................. 378/182 |
| 4,823,372 | 4/1989 | Svendsen ................................. 378/185 |
| 4,827,136 | 5/1989 | Bishop, Jr. et al. .................. 250/484.4 |
| 4,870,285 | 9/1989 | Ohgoda ................................. 250/484.4 |
| 4,893,011 | 1/1990 | Bauer et al. . |
| 4,931,641 | 6/1990 | Ohgoda . |
| 5,025,465 | 6/1991 | Bauer et al. .......................... 250/484.4 |
| 5,065,180 | 11/1991 | Shindo ....................................... 355/72 |
| 5,065,866 | 11/1991 | Boutet et al. ......................... 250/484.4 |
| 5,087,025 | 2/1992 | Hamada .................................... 271/14 |
| 5,157,264 | 10/1992 | Kinanen et al. ...................... 250/484.4 |
| 5,166,524 | 11/1992 | Lee et al. . |
| 5,168,160 | 12/1992 | Jeromin et al. ......................... 250/591 |
| 5,180,915 | 1/1993 | Ohgoda . |
| 5,268,569 | 12/1993 | Nelson et al. .......................... 250/591 |
| 5,268,950 | 12/1993 | Vogelgesang et al. .................. 378/29 |
| 5,319,206 | 6/1994 | Lee et al. ............................... 250/580 |
| 5,381,014 | 1/1995 | Jeromin et al. ........................ 250/580 |

FOREIGN PATENT DOCUMENTS

| 0 026 663 A2 | 9/1980 | European Pat. Off. . |
|---|---|---|
| 0 522 317 A1 | 1/1993 | European Pat. Off. . |
| 0 544 138 A2 | 6/1993 | European Pat. Off. . |
| 0 567 171 | 10/1993 | European Pat. Off. . |
| 58-187 976 | 11/1983 | Japan . |
| 63-021 644 | 1/1988 | Japan . |

*Primary Examiner*—Edward J. Glick
*Assistant Examiner*—Darren M. Jiron
*Attorney, Agent, or Firm*—William K. Weimer

[57] ABSTRACT

A cassette for use in an electronic radiographic imaging system having electronic components. The cassette includes a positioned photoreceptive medium, a light-tight frame, at least one power storage device, and an electronic interface structure for connection to electronic components within the radiographic imaging system. The cassette can also include an electrical interface structure for connection to a power source within the radiographic imaging system.

39 Claims, 13 Drawing Sheets

CASSETTE FOR USE IN AN ELECTRONIC RADIOGRAPHIC IMAGING SYSTEM

This is a continuation of application Ser. No. 08/220,899 filed Mar. 31, 1994 now abandoned.

FIELD OF THE INVENTION

The invention relates to a cassette which includes a photoreceptive medium capable of holding a radiographic image of an object and more particularly to a cassette for use within an electronic radiographic imaging system.

BACKGROUND OF THE INVENTION

X-ray film cassettes provide a convenience in handling of photosensitive films in medical and industrial radiographic applications. Conventional cassettes typically contain one or more phosphor screens that are excited by the x-rays to produce photons which are primarily responsible for the formation of a latent image in a photographic film. The cassette generally consists of a light-proof shallow box with a hinged or removable back plate or cover. The use of this type of cassette involves a cycle which first includes loading the film into the cassette while within a dark room. After film loading, the cassette is taken to a radiography site where the film within the cassette is exposed to the x-rays which create the latent image in the film. After exposure, the cassette is returned to the dark room where the film is removed and placed into a processor for development of the image. U.S. Pat. No. 4,823,372 (Svendsen; Film Exposure And Processor System; issued Apr. 18, 1989) describes a system which minimizes the inconvenience of unloading the exposed film in the dark by automatically removing the exposed film and feeding it into the processor while reloading the cassette with an unexposed film. This process, however, still uses photographic films which require a light-controlled environment throughout the film-handling cycle. In addition, photographic film can be used only once and the cost of each film sheet is not insignificant. Furthermore, use of photographic film involves wet processing chemistry the disposal of which has been identified as a significant environmental concern.

More recently, computed radiography has been introduced which does not require conventional wet-processed photosensitive films. These systems utilize reusable photoreceptive mediums, such as photostimulable phosphor films and electrostatic plates. The photoreceptive medium is exposed to x-ray radiation forming a latent image. The cassette which contains the photoreceptive medium can be taken to a photoreceptive medium reader for read-out of the latent image. The cassettes used in these applications are typically designed such that the photoreceptive medium is removed from the cassette when the cassette is loaded into the photoreceptive medium reader, such as those described in U.S. Pat. Nos. 5,180,915 (Ohgoda; Radiation Image Information Reading Apparatus; issued Jan. 19, 1993); 5,025,465 (Bauer et al.; X-Ray Cassette For Foils With Phosphor Layer; issued Jun. 18, 1991); 4,870,285 (Ohgoda; Cassette For Information Recording Mediums; issued Sep. 26, 1989); 4,126,788 (Koontz et al.; Photoreceptor Plate Cassette For Use In Automated X-Ray Image Processing Systems; issued Nov. 21, 1978); and 3,827,072 (Bevis et al.; Cassette; issued Jul. 30, 1974). A problem associated with this approach is the requirement of special handling devices for extracting the photoreceptive medium from and returning it to the cassette. Because the position of the photoreceptive medium relative to the photoreceptive medium reader is important, the handling devices must be capable of accurately positioning the photoreceptive medium and maintaining that position within the photoreceptive medium reader. Similarly, because these reusable photoreceptive mediums are more expensive than photographic film, special care is required during handling to prevent any damage to the photoreceptive medium surface and overall structure.

Within European Patent Application No. 522,317 A1 (Robertson; Cassette For Storage Phosphor Plate; filed Jun. 15, 1992) and U.S. Pat. Nos. 5,065,866 (Boutet et al.; Storage Phosphor Cassette Assembly; issued Nov. 19, 1991) and 4,827,136 (Bishop, Jr. et al.; Cassette Having Photostimulable Luminescent Substrate; issued May 2, 1989), the photoreceptive medium is secured within a drawer which can be moved into and out of a shell. Within this structure, the photoreceptive medium is exposed to x-rays while within the shell and read when the drawer is removed from the shell. This approach is suitable for photoreceptive media, such as photostimulable phosphor films.

As described in U.S. Pat. Nos. 4,126,788 and 3,898,722, other cassettes include an electrode or capacitor within the cassette cover. The purpose for these components is to attract positive ions, created by x-ray radiation exposure, in the air space above the photoreceptive medium. Attracting positive ions toward the electrode moves them away from the photoreceptive medium thereby preventing the ions from forcing the charges within the photoreceptive medium to move laterally. Lateral movement of these charges causes an undesirable smearing of the image stored within the photoreceptive medium described within these references.

SUMMARY OF THE INVENTION

The present invention overcomes these problems by providing a cassette which protects a photoreceptive medium, which can contain a latent image, from actinic radiation and from physical impact. In addition, the invention can apply a voltage across the photoreceptive medium and can provide electronic and electrical interface structures for connection of the photoreceptive medium to external power supplies and electronic components useful for read-out of the latent image.

In one embodiment, the invention is a cassette adapted for use in an electronic radiographic imaging system having electronic components. The cassette consists of a photoreceptive medium, a frame, at least one power storage device, and an electronic interface structure. The frame is designed for supporting the photoreceptive medium throughout a cycle of use through which the cassette passes and for protecting the photoreceptive medium from ambient actinic radiation. The power storage device is housed and supported within the frame, and is electrically connectable to the photoreceptive medium. The electronic interface structure is provided for electronically connecting the photoreceptive medium to the electronic components external of the cassette to enable the electronic components to acquire image information from the medium.

In a preferred embodiment, the cassette has a mechanism for reducing the initial exposure voltage applied to the medium by the power storage device to a lower maintenance voltage. The lower maintenance voltage extends the period of time for which the medium can maintain the latent image. The power storage device can include a plurality of capacitors arranged in series. Shorting one or more of the capacitors reduces the voltage applied across the photoreceptive medium.

Additionally, the cassette can include an electrical interface structure. The electrical interface structure allows for the electrical connection of the photoreceptive medium to an external power source or to a power storage device recharger.

In addition, the frame can include a base and an openable cover. The openable cover is x-ray translucent allowing exposure of photoreceptive medium while the photoreceptive medium is covered and protected by the openable cover. Upon read-out of the photoreceptive medium, the openable cover can be opened to allow reading access to a photoreceptive medium reader.

Furthermore, the frame can include a latching mechanism. The latching mechanism maintains the attachment of the openable cover to the base during all phases of use other than the read-out of the photoreceptive medium.

BRIEF DESCRIPTION OF THE DRAWINGS

The foregoing advantages, construction, and operation of the present invention will become more readily apparent from the following description and accompanying drawings in which.

DETAILED DESCRIPTION OF THE PREFERRED EMBODIMENTS

A cassette is adapted for use within an electronic radiographic imaging system and process. The cassette includes a photoreceptive medium and allows for the creation and reading of the latent image within the medium. The cassette structure is of a compact size suitable for medical radiographic applications including insertion into existing medical imaging tables. The cassette size could also be made suitable for larger industrial radiographic applications including the inspection of structural welds. The cassette is sufficiently durable to withstand the handling involved in its use.

Figure 1:
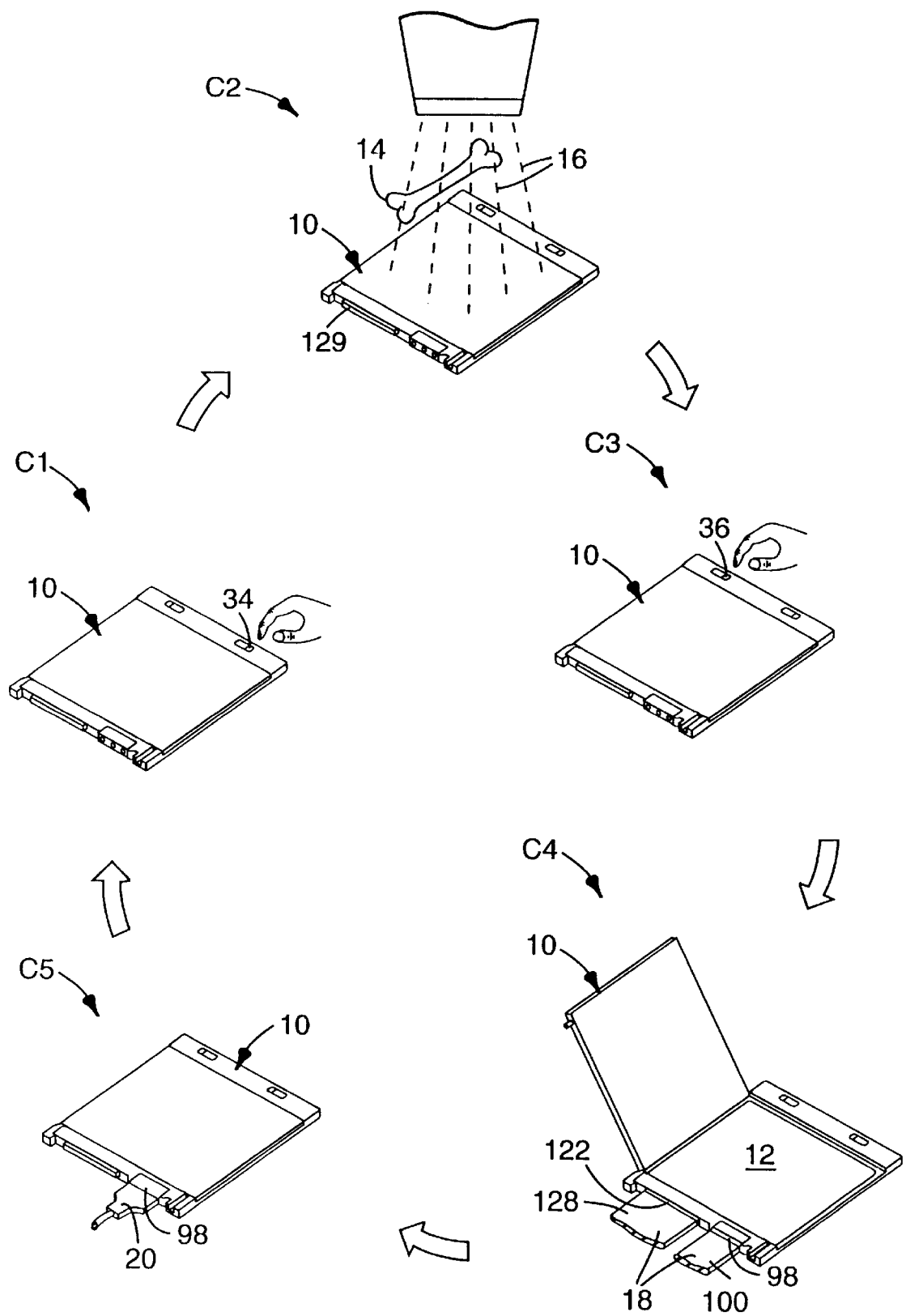
FIG. 1 is a schematic view of a cycle of the electronic radiographic imaging system of which the cassette is a part.

The use of the cassette 10 within the electronic radiographic imaging system is shown in FIG. 1 as a cycle C. First, in the voltage-applying step C1, a user selects a conditioned and charged cassette 10 and manually causes the cassette to apply a high exposure voltage to the photoreceptive medium 12 suitable for the creation of a latent image. Second, in the medium-exposing step C2, the user positions an object 14 relative to the cassette 10 and exposes the object 14 to x-ray radiation 16. Exposure of the object 14 to radiation 16 provides an image-wise pattern of radiation to the photoreceptive medium creating the latent image of the object 14 in the photoreceptive medium 12. Third, in the image-maintaining step C3, the user can choose to reduce the voltage to a lower maintenance voltage suitable for maintaining the image for an extended period of time. Fourth, in the image-reading step C4, the user inserts the cassette 10 into an electronic radiographic image reader 18 which reads, or processes, the latent image. The reader 18 also reconditions the photoreceptive medium 12 which partially prepares the photoreceptive medium for the next cycle C. Last, in the cassette-recharging step C5, the user connects the cassette 10 to a recharger 20 to finalize the preparation of the cassette 10 for the next cycle C. This cycle C and the cassette structure required to complete the cycle are described below.

One embodiment of the photoreceptive medium 12 of the present invention is described in detail in U.S. Pat. No. 5,268,569 (Nelson et al.; Imaging System Having Optimized Electrode Geometry and Processing; issued Dec. 7, 1993) and U.S. Pat. No. 5,354,982 (Nelson et al.; Imaging System Having Optimized Electrode Geometry and Processing; filed Dec. 6, 1993), both which are hereby incorporated by reference.

Figure 2:
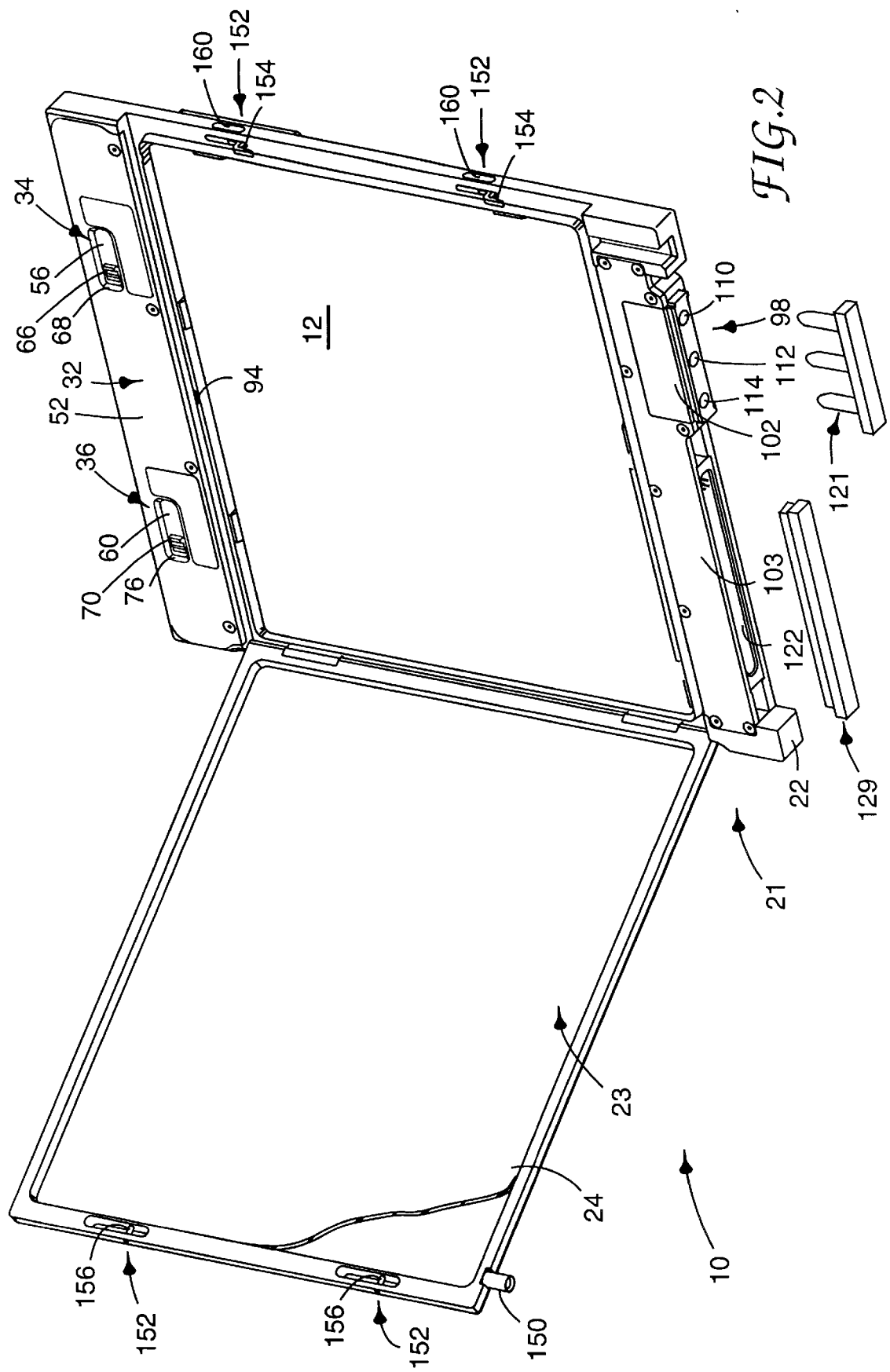
FIG. 2 is a perspective view of one embodiment of the cassette shown with the cover opened.

As shown in FIG. 2 the cassette further includes a frame 21 which supports and protects the photoreceptive medium 12 from ambient actinic radiation. While the photoreceptive medium 12 can be positioned within the frame 21 throughout the entire cycle C, it is recognized that removal of the photoreceptive medium 12 from the frame 21 is possible within the scope of this invention. For example, removal may be advantageous if the photoreceptive medium 12 were in need of repair or replacement.

The frame 21 includes a base 22 and an openable cover 23. The base 22, in which the photoreceptive medium 12 rests, can be constructed of lightweight material, such as a thermoplastic material, such as nylon, or a thermoset material, such as polyurethane. Other suitable materials include composites, laminates, or fiber-reinforced polymers. Material strength and flex modulus, as well as thermal expansion coefficients should also be considered in material selection to minimize flex and thermal expansion mismatch between the material of the photoreceptive medium 12 and the frame 21. The construction of the base 22 could include structural members (not shown) for additional strength and stiffness. The base 22 could also include compressible foam or bumpers (not shown) which would contact the photoreceptive medium 12 for shock absorption during cassette handling. The base 22 could also include a lead foil (not shown) located beneath the photoreceptive medium 12 to reduce x-ray backscatter.

The cover 23 is connected and movable relative to the base 22. One embodiment of the frame 21 includes hinges which connect the cover 23 to the base 22 and allow the cover 23 to be swung open for the image-reading step C4. Although the cover 23 is shown as being flat, it could as easily be dome-shaped for greater protection of the photoreceptive medium 12. The cover 23 can be constructed of a carbon fiber-reinforced thermoplastic for lightweightness, strength, rigidity, and x-ray translucency. The strength and rigidity are desirable in that the cover 23 should remain a slight distance from the photoreceptive medium 12 even when the cassette 10 is under a load, such as the weight of a person undergoing an x-ray procedure. The x-ray translucency is desirable in that the medium-exposing step C2 does not require the opening of the cover 23.

Figure 3:
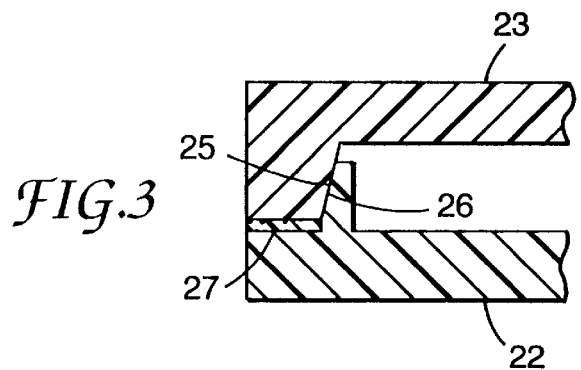
FIG. 3 is partial cross-sectional view of the cassette of FIG. 2 with the cover closed.

As shown in FIG. 2, the cover includes an electrical insulative structure 24 which isolates the cover 23 from the voltage within the cassette 10. The electrical insulative structure 24 can be constructed of a vacuum-formed material, such as polyethylene terephthalate glycol or polycarbonate. In addition, the base 22 and cover 23 provide a light barrier which protects the image-storing capability of the photoreceptive medium 12. A circumferential, bevelled ridge 25 on the cover 23 interlocks with a circumferential, bevelled ridge 26 on the base 22, as shown in FIG. 3. An additional light barrier and a liquid or foreign matter barrier can be provided by a circumferential gasket 27 compressed between the base 22 and the cover 23. The gasket 27 could consist of a closed-cell foam.

Figure 4:
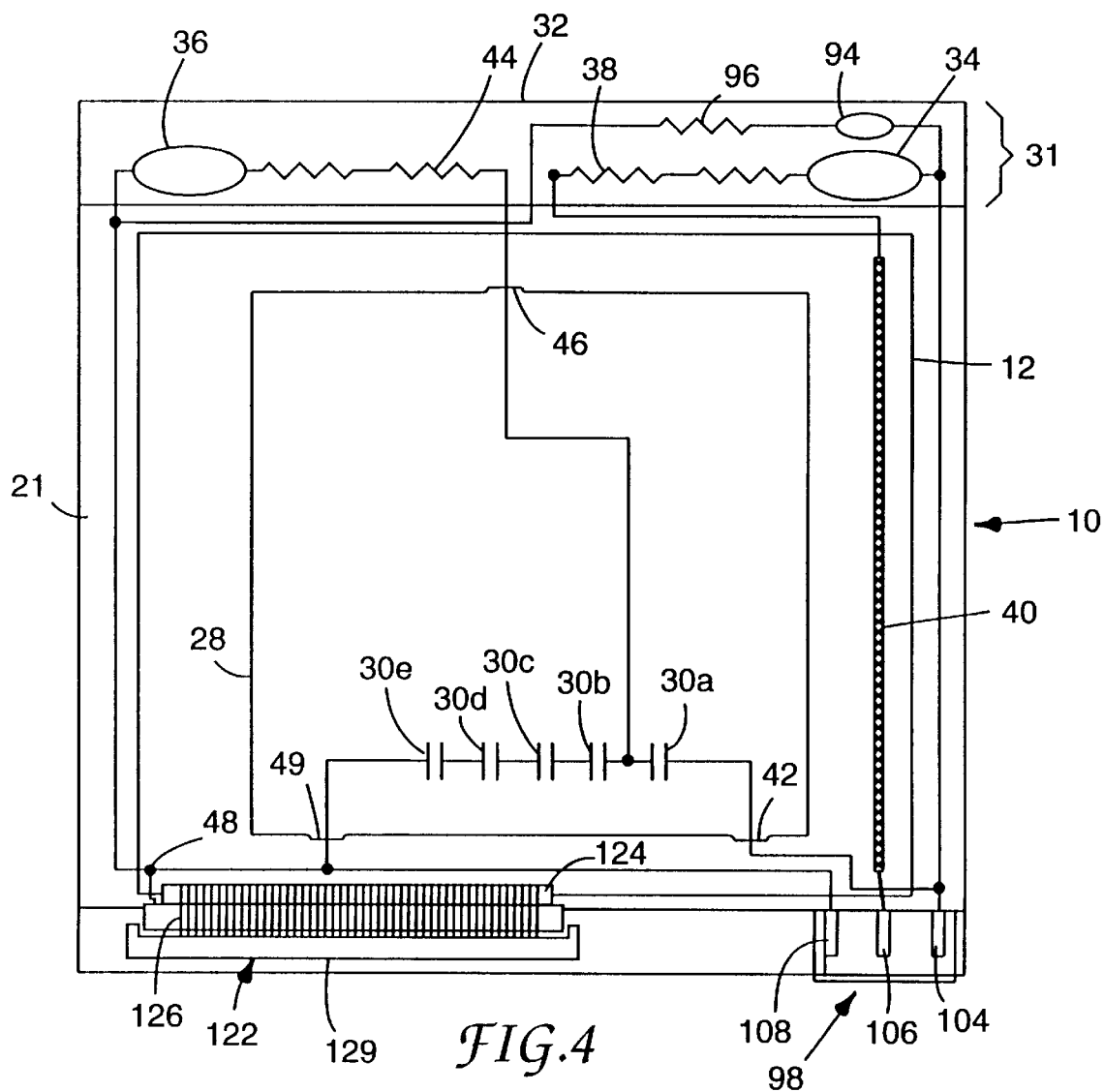
FIG. 4 is a schematic view of one embodiment of the electrical circuit within the cassette including the power storage device and the switch structure.

As shown in the schematic electrical circuit of FIG. 4, the frame 21 also houses and supports a power storage device 28 which is electrically connectable to the photoreceptive medium 12. The power storage device 28 has the ability to apply the high exposure voltage to the medium 12 to create an electric field within the photoreceptive medium 12 suitable for the medium-exposing step C2 and the image-maintaining step C3. While the power storage device 28 can consist of at least one capacitor, a specific embodiment includes five capacitors 30a, 30b, 30c, 30d, 30e connected in series. The voltage required for the medium-exposing step C2 determines the selection of the capacitors. Other embodiments of the power storage device 28 could include a DC-DC converter with either a capacitor, a battery, or both. Still further embodiments of the power storage device 28 could include a battery with a solar cell.

The power storage device 28 is electrically connectable to means for controlling the level of the voltage applied to the photoreceptive medium 12. This control is useful during the voltage-applying step C1, the image-maintaining step C3, and the image-reading step C4, or some combination of these steps. One embodiment providing this means includes a switch structure 32 which further includes a first switch 34 and a second switch 36.

The first switch 34 is electrically connected in series with a first resistor 38 which is electrically connected at its other end to a high voltage interface 40. The high voltage interface 40 is, in turn, connected to or a part of the photoreceptive medium 12. The other end of the first switch 34 is connected to a first terminal 42 of the power storage device 28.

The second switch 36 is electrically connected in series with a second resistor 44. The second resistor 44, like the first resistor 38, is current-limiting, and each consists of two in-series, 10-megohm, high voltage resistors. The second resistor 44 is electrically connected at its other end to a tap terminal 46 of the power storage device 28. The tap terminal 46 is electrically connected to the power storage device 28 between capacitor 30a and capacitors 30b. The other end of the second switch 36 is grounded to a ground termination 48, as is a second terminal 49 of the power storage device 28.

When the capacitors 30a–e are charged and the switches 34, 36 are both open, the power storage device 28 does not apply a voltage to the photoreceptive medium 12. But, when the user closes the first switch 34, the voltage from the five capacitors is applied across the high voltage interface 40 and the photoreceptive medium 12. The application of this exposure voltage completes the voltage-applying step C1 and prepares the photoreceptive medium 12 for the medium-exposing step C2.

Following the creation of the latent image in the medium-exposing step C2, the user can choose to close the second switch 36. Closing the second switch 36 discharges four of the five capacitors 30b–e by shorting them to the ground termination 48. Closing the second switch 36 is, therefore, a means of reducing the voltage across the photoreceptive medium 12 to a maintenance voltage provided by the remaining capacitor 30a. By reducing the voltage, the latent image is maintained within the photoreceptive medium for a period greater than if the voltage was not reduced. This can be important when the medium-exposing step C2 is not immediately followed by the image-reading step C4. As a result, the act of reducing the voltage completes the image-maintaining step C3.

The embodiment shown includes five 150-nanofarad capacitors 30a–e connected in series to equal 30 nanofarads. The image-maintaining step C3, just described, reduces the voltage across the photoreceptive medium 12 to 20% of the voltage applied by the five equal capacitors 30a–e which are connected in series. These five capacitors 30a–e can provide a voltage of approximately 10,000 volts which is suitable for the medium-exposing step C2. In the situation when four of the five capacitors 30b–e are shorted, the remaining capacitor 30a can provide a maintenance voltage of 2,000 volts, which is suitable for the image-maintaining step C3.

Figure 5:
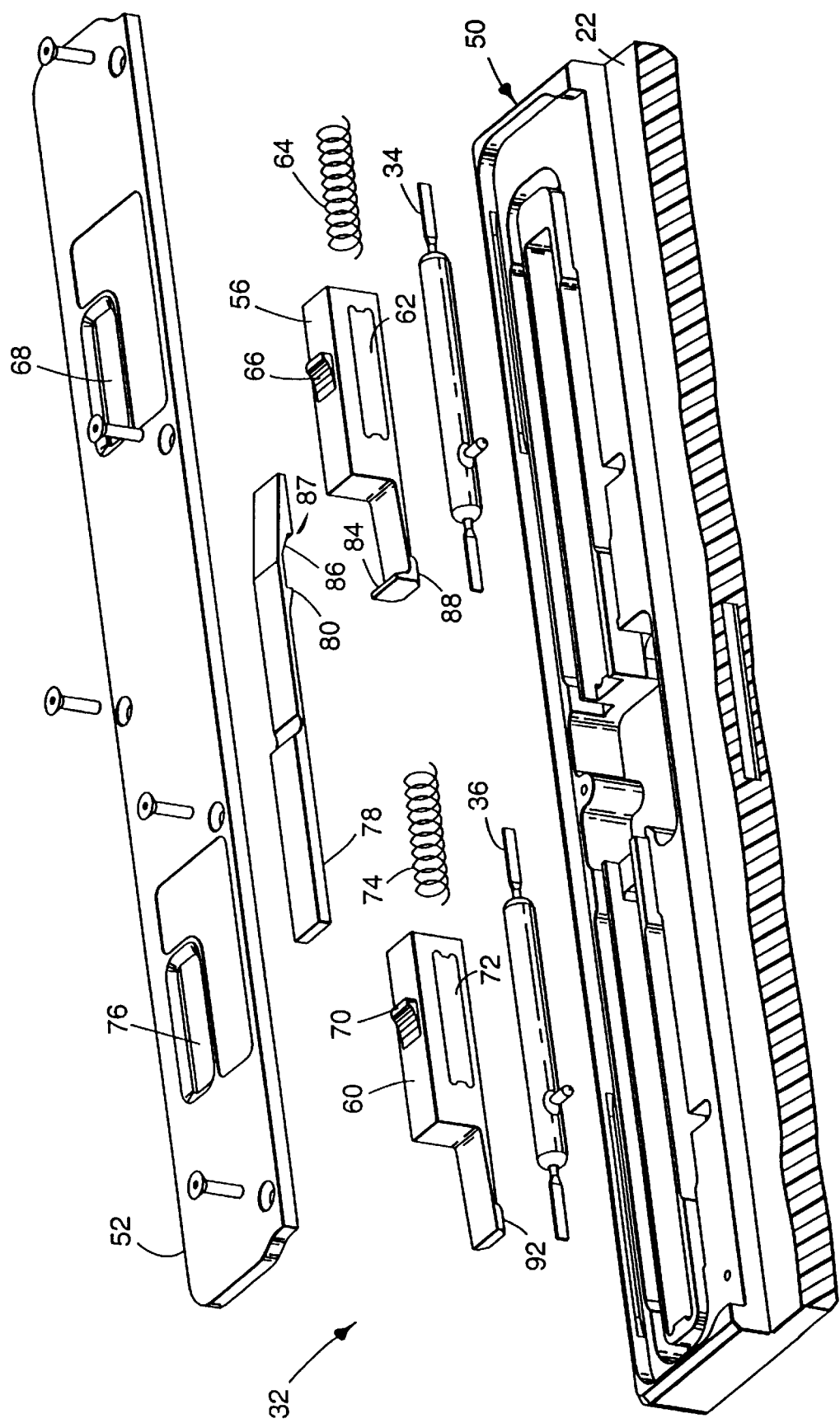
FIG. 5 is an exploded view of the switch structure.

The switch structure 32 is exploded in FIG. 5. Between the switch housing 50 and the switch cover 52, the first switch 34 and second switch 36 are shown as magnetic reed switches. The switch housing is shown as integral to the cassette base 22. The switch cover can be constructed of the same materials as the base 22, preferably a moldable resin. The reed switches are designed to remain open in the absence of a magnetic field.

A first switch actuator 56 and a second switch actuator 60, constructed of a thermoplastic or thermoset resin, are located adjacent to the first switch 34 and the second switch 36, respectively. Although a first magnet 62 within the first switch actuator 56 can provide a magnetic field, a first spring 64 biases the first switch actuator 56 and the first magnet 62 in a position such that the first switch 34 is outside the field. Only when the first switch actuator 56 is manually moved against the bias of the first spring 64, such that the first magnet 62 is moved in close proximity to the first switch 34, does the field close the first switch 34. Because the ergonomically-designed raised interface 66 of the first witch actuator 56 extends through a first switch cover access 68, a user's finger can apply the force to move the first switch actuator 56 to close the first switch 34 as shown in FIG. 1. The second switch 36 functions in the same manner including corresponding structures: the second switch actuator 60 having a raised interface 70, a second magnet 72, a second spring 74, and a second switch cover access 76.

To insure that the proper exposure voltage is applied to the photoreceptive medium 12 for the medium-exposing step C2, the second switch 36 can not be closed prior to first switch 34. To prevent this, the switch structure 32 includes an interlock mechanism 78 which is an injection-molded or machined component constructed of such resin as polycarbonate. The interlock mechanism 78 is located between the first switch actuator 56 and second switch actuator 60. In the sectional view of FIG. 6, the interlock mechanism 78 is shown positioned relative to the switch actuators 56, 60, which are shown in their respective open positions within the switch structure 32. Because a locking ridge 80 on the interlock mechanism 78 contacts a locking wall 82 on the switch housing 50 and the interlock mechanism 78 contacts the second switch actuator 60, the second switch actuator 60 cannot be moved to close the second switch 36.

Figure 6:
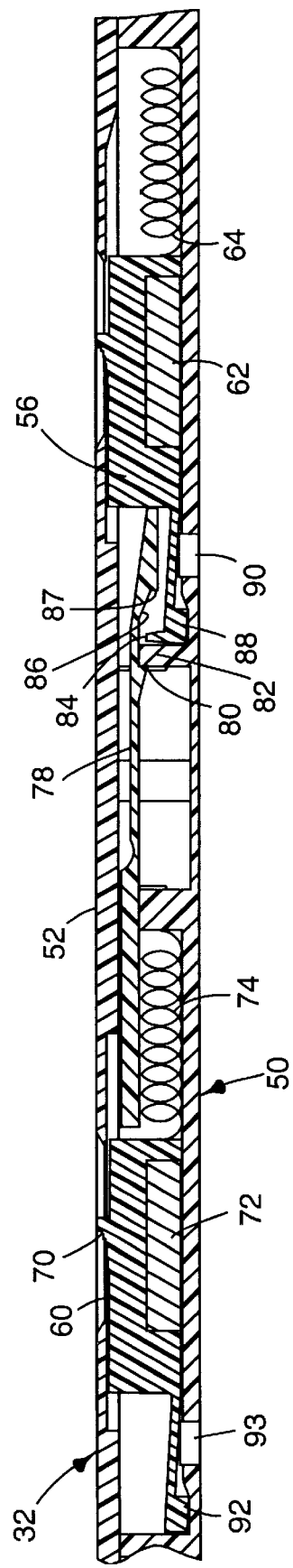
FIG. 6 is a side sectional view of the switch structure showing each switch in an open position.
Figure 7:
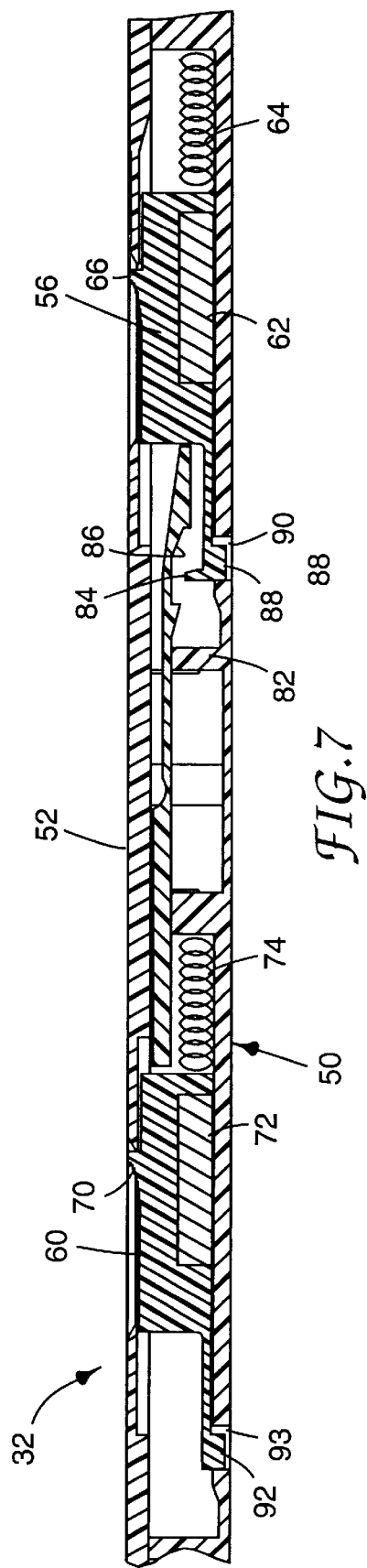
FIG. 7 is the same view as in FIG. 6, but with each switch in a closed position.
Figure 8:
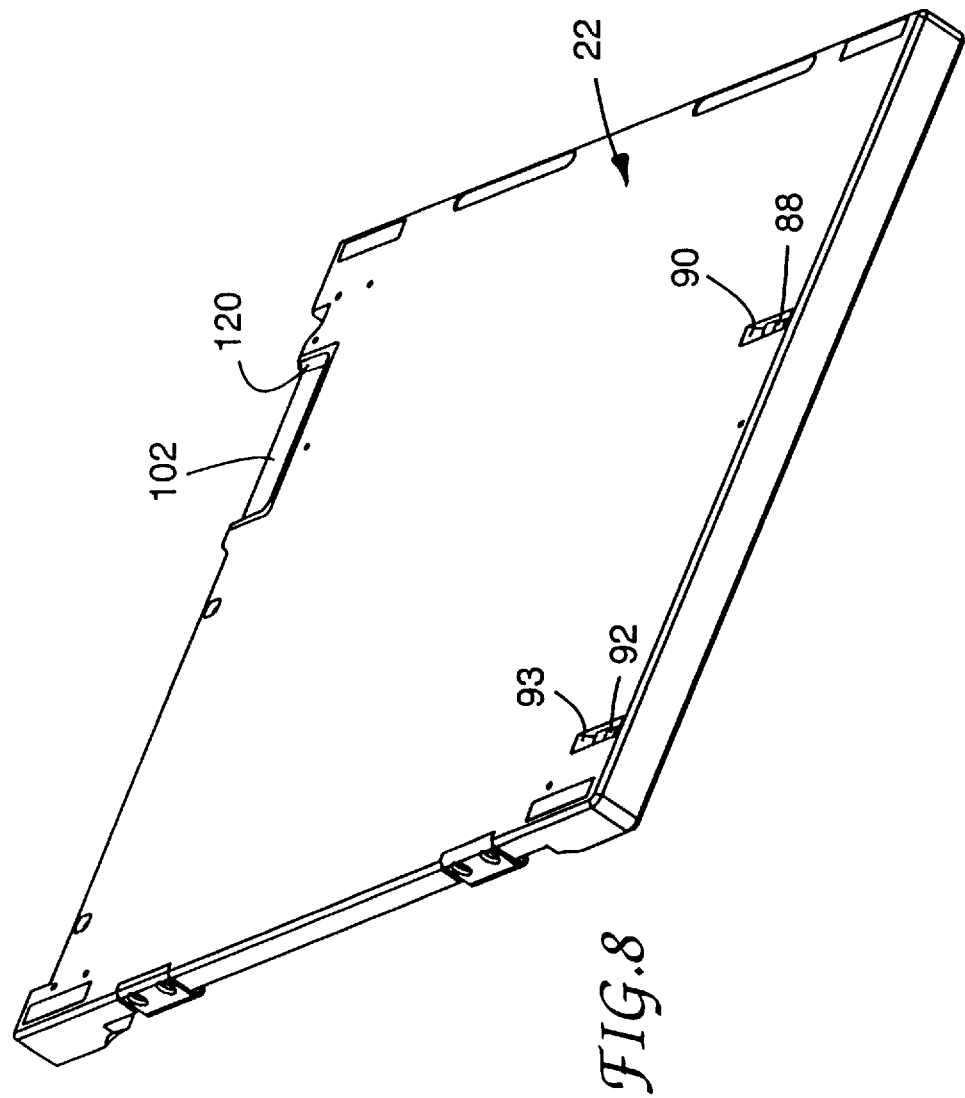
FIG. 8 is a perspective view of the bottom of the cassette of FIG. 2 showing switch actuator tabs resting within corresponding housing accesses.

When the first switch actuator 56 is moved to close the first switch 34 and in a direction away from the interlock mechanism 78 as shown in FIGS. 6 and 7, a raised ridge 84 on the first switch actuator 56 slides along a ramped surface 86 and contacts a pulling wall 87 of the interlock mechanism 78. After the first switch actuator 56 is moved a sufficient distance, the locking ridge 80 is lifted up and pulled over the locking wall 82. At approximately the same instance, a first switch actuator tab 88 drops within a first switch housing access 90, as shown in FIGS. 7 and 8. The engagement of the first switch actuator tab 88 and the access 90 prevents the first switch actuator 56 from returning to the open position in spite of the bias of the first spring 64. By preventing this return, the exposure voltage is continually applied to the photoreceptive medium 12 during the medium-exposing step C2. Once the locking ridge 80 is free of the locking wall 82, the second switch actuator 60 can be moved by the user. As previously noted, this motion brings the second magnet 72 in close proximity with the second switch 36, which closes the second switch 36 and reduces the voltage during the image-maintaining step C3. Like the first switch actuator 56, when the second switch actuator 60 is moved a sufficient distance to close the second switch 36, a second switch actuator tab 92 falls within a second switch housing access 93. This engagement prevents the second switch actuator 60 from returning to the open position in spite of the bias of the second spring 74. By preventing this return, the maintenance voltage is continually applied to the photoreceptive medium 12 during the image-maintaining step C3.

In addition to allowing intentional voltage reduction by the user, the cassette has the capability to automatically reduce the voltage when the cover 23 is opened. To reduce the user's risk of inadvertent contact with the high voltage across the power storage device 28 or the photoreceptive medium 12, a fail-safe switch 94 is located between the base 22 and cover 23, as shown in FIGS. 2 and 4. When the cover 23 is opened, the fail-safe switch 94 automatically closes which shorts the power storage device 28 through a fail-safe resistor 96, as shown in FIG. 4. If the first switch 34 is closed when the cover 23 is opened, the fail-safe switch 94 shorts the photoreceptive medium 12 through the fail-safe resistor 96. Consequently, opening the cover 23 can automatically discharge the power storage device 28 and the photoreceptive medium 12 thereby reducing the voltage within the cassette 10. However, when the cassette 10 is properly registered within the reader (not shown), the reader can include a magnet (not shown) which pulls the fail-safe switch 94 downward preventing switch closure even when the cassette cover 23 is opened.

Figure 9:
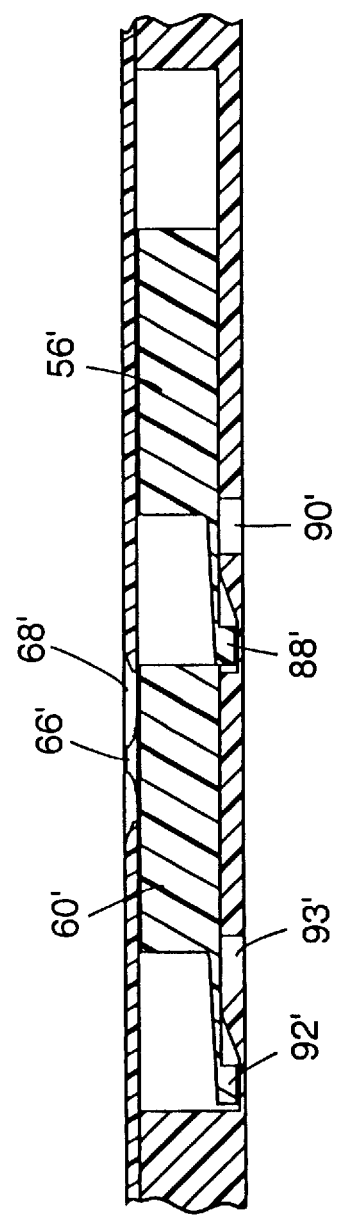
FIG. 9 is an alternate embodiment of the switch subsystem.

Another embodiment of the switch structure 32 includes a modification of the first and second switch actuators 56, 60. In FIG. 9, both switch actuators 56', 60' are positioned so that no voltage is applied across the photoreceptive medium 12. To apply the exposure voltage, a user pushes the raised interface 66' on the second actuator 96 to the right. This forces the tab 88 of the first actuator 56' and the tab 92' of the second actuator 60' into the first and second switch housing accesses 90', 93' respectively. To reduce the voltage to the maintenance voltage, a user pushes the raised interface 66' on the second actuator 60' back to the left. To read the photoreceptive medium 12, the reader 18 pushes the tab 88' of the first actuator 56' out of the first switch housing access 90'. This causes the cassette 10 to apply no voltage to the photoreceptive medium 12 by shorting the medium 12 to ground. As seen, this embodiment requires no interlock mechanism 78 and only requires one raised interface 66' and one switch cover access 68'.

Figure 10:
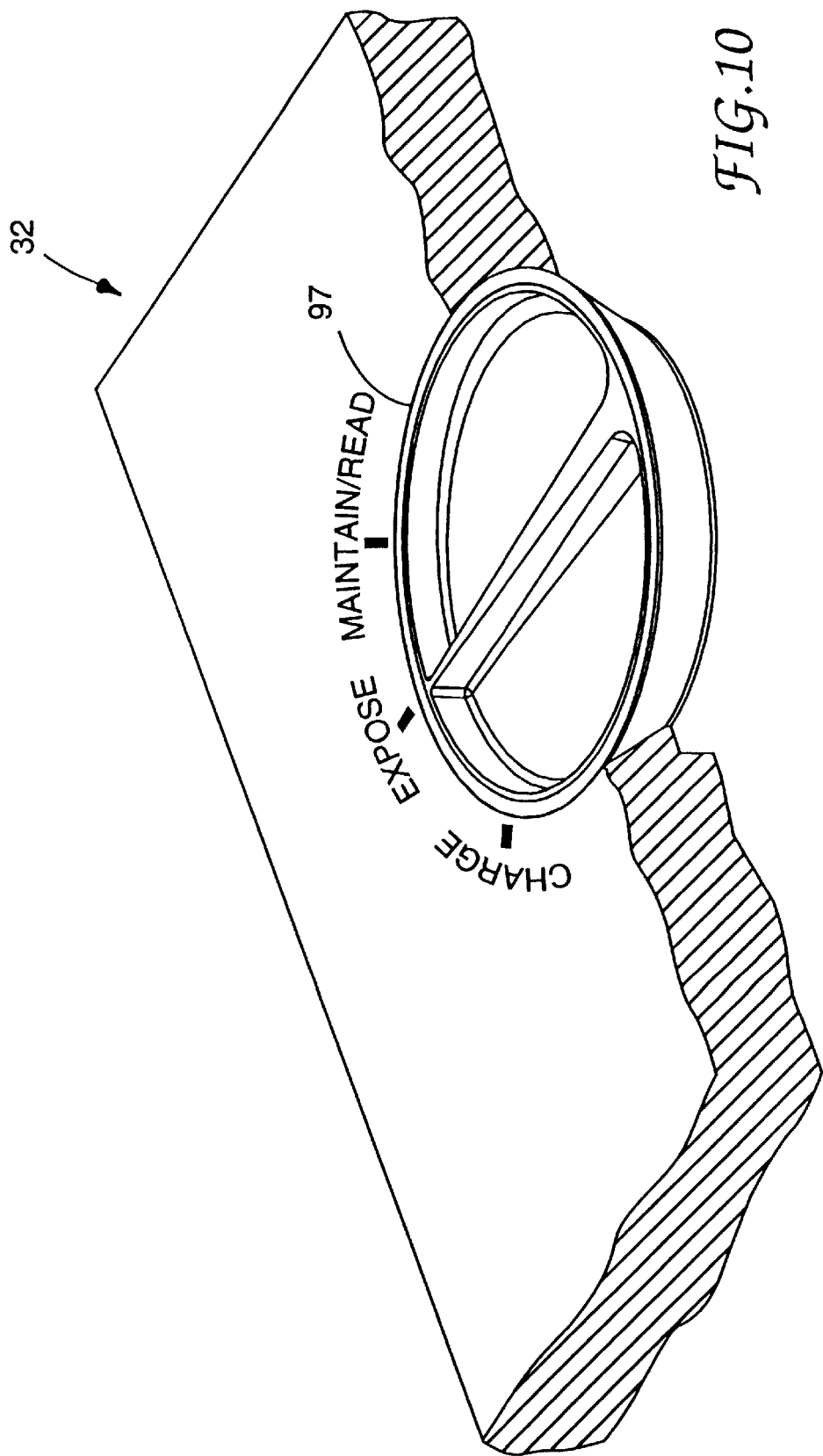
FIG. 10 is an alternate embodiment of the switch subsystem.

Still another embodiment of the switch structure, shown in FIG. 10, includes a single circular switch actuator 97 in place of the two sliding switch actuators 56, 60. The advantage of the circular actuator 97 is that an O-ring can be placed between the actuator and the switch cover to provide a liquid seal. A complete liquid seal would provide the cassette 10 an electrical and microbial barrier.

To begin the image-reading step C4, the user can connect the cassette 10 electronically and electrically to the image reader 18. The reader 18 can automatically open the first and second switches 34, 36 of the cassette 10 shown in FIG. 5. Structure (not shown) within the reader 18 forces the first and second actuator tabs 88, 92 out of their corresponding first and second first switch housing accesses 90, 93. As a result, the springs 64, 74 move the first and second actuators 56, 60 to a position where the magnets 62, 72 no longer close the switches 34, 36. The reader 18, including the switch-opening structure and other structure for scanning, cover-opening, and reconditioning, is further described in U.S. patent application Ser. No. 08/221,191, filed on even date herewith and identified presently as 3M Docket No. 50134USA1A (Steffen et al.; Radiographic Image Reader), which is hereby incorporated by reference.

For the high voltage electrical connection to the reader 18, the cassette 10 can include an electrical interface structure 98, as shown in FIGS. 1, 2, and 4, which connects to a high voltage power source 100 in the reader 18, as shown in FIG. 1. The power supply 100 can, via the high voltage interface 40, apply a voltage higher than the maintenance voltage remaining within the cassette 10 and more suitable for the image-reading step C4.

Figure 11:
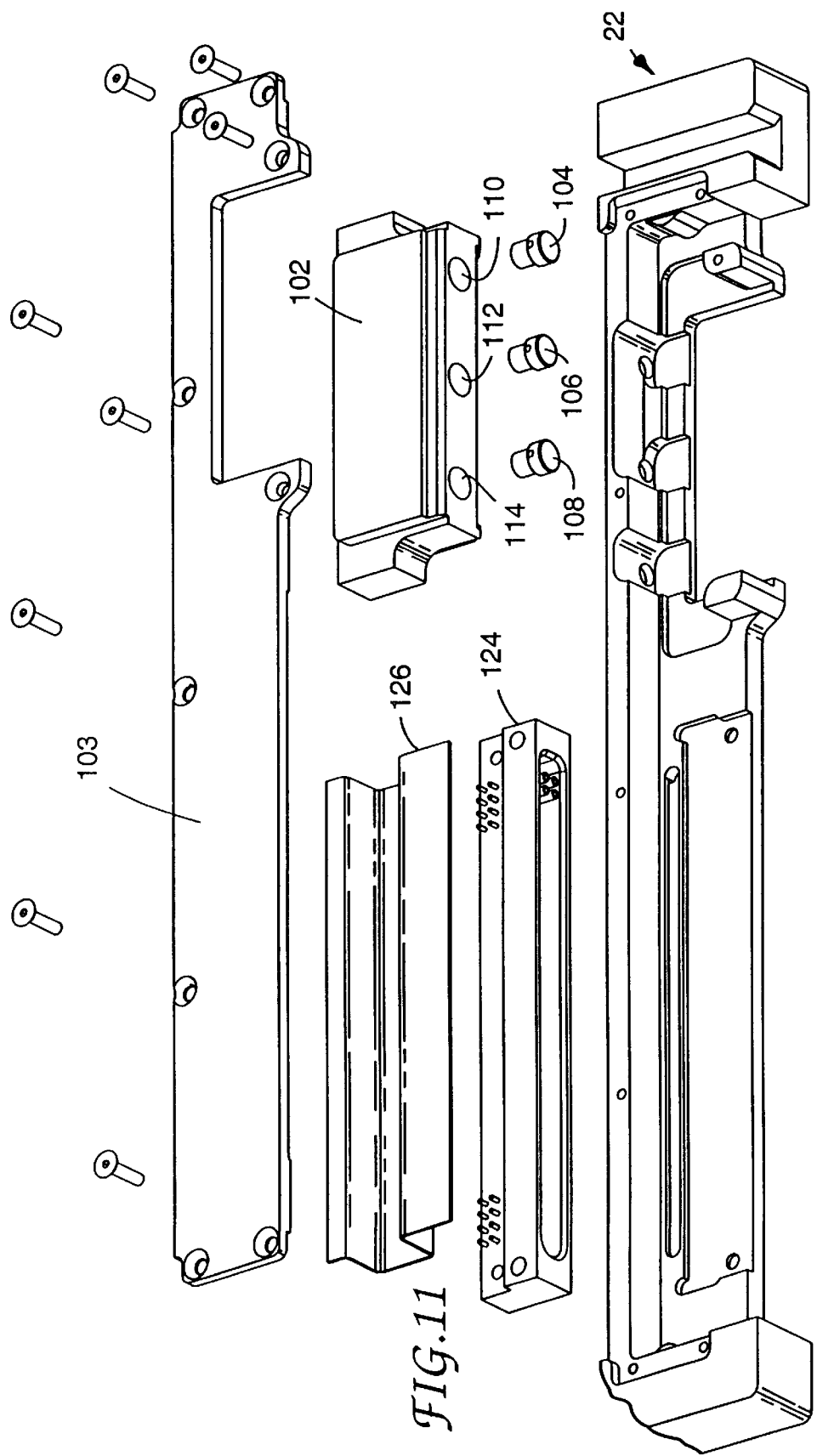
FIG. 11 is an exploded view of the electrical interface and electronic interface structures.
Figure 12A:
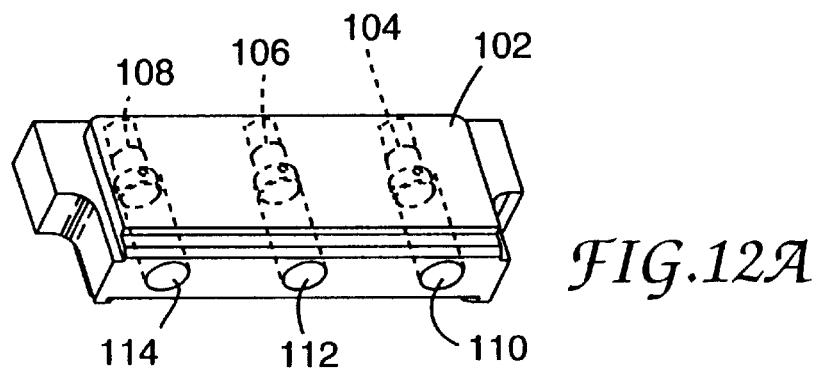
FIG. 12 is an enlarged perspective view of the electrical interface structure and reader and recharger components.

As shown in FIG. 11, the rugged, though compact electrical interface structure 98 includes a female block 102 located between an interface cover 103 and the base 22. The female block is preferably made of a dielectric material, such as polycarbonate, and has a sufficient robustness to withstand the arcing which can occur during connection and disconnection. As shown in FIG. 12A, the female block 102 includes three electrical pad connectors 104, 106, 108 which correspond to pin-receiving holes 110, 112, 114, respectively, and which are connected to the switch structure 32 and power storage device 28 shown in FIG. 4. The pad connectors, made of copper, brass or the like, are designed to electrically connect or mate the cassette to pins mounted on high voltage power source 100 within the reader 18 and the recharger 20 shown in FIG. 1.

Figure 12B:
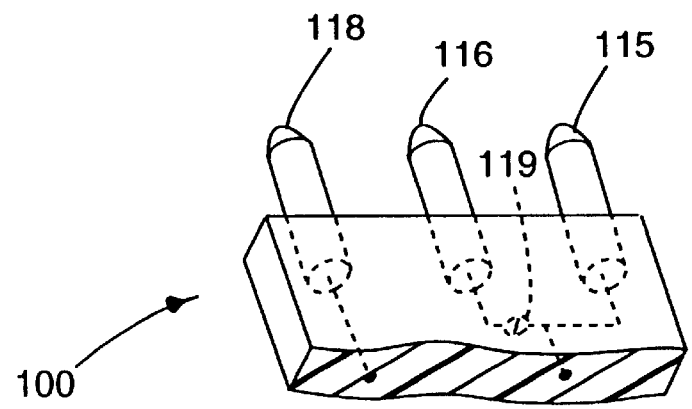
Figure 12C:
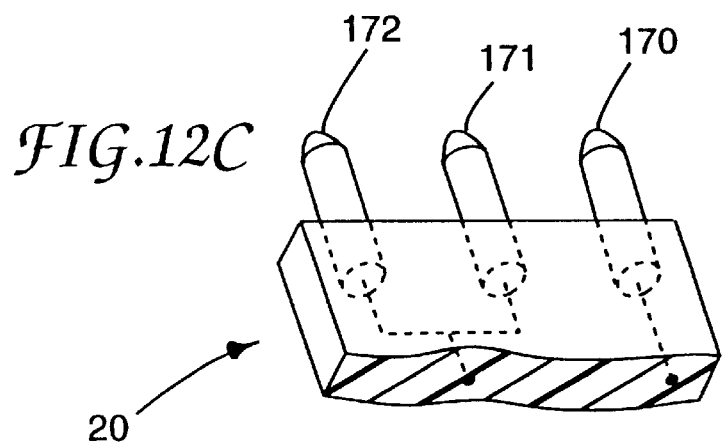

FIGS. 12A–C further depict the reader pins 115, 116, 118 and recharger pins 170, 171, 172 which mate with pad connectors 104, 106, and 108, respectively. When the reader pins 115 and 118 are electrically connected to pad connectors 104 and 108, respectively, the power source 100 within the reader 18 recharges the power storage device 28 to a read-out voltage of approximately 4,000 volts. Just prior to scanning the photoreceptive medium 12, the reader 18 can close a reader switch 119 between the pins 115 and 116 and turn off the power supply 100. Closing the reader switch 119 applies the 4000 volts from the power storage device across the photoreceptive medium 12 for readout. Turning off the power supply 100 reduces electrical noise which can disrupt the read-out.

Alternatively, if electrical noise is not a concern, the power source could be arranged so that the voltage is applied only across the photoreceptive medium 12 during read-out. This could be accomplished if reader pin 115 were not used (not shown).

Figure 13:
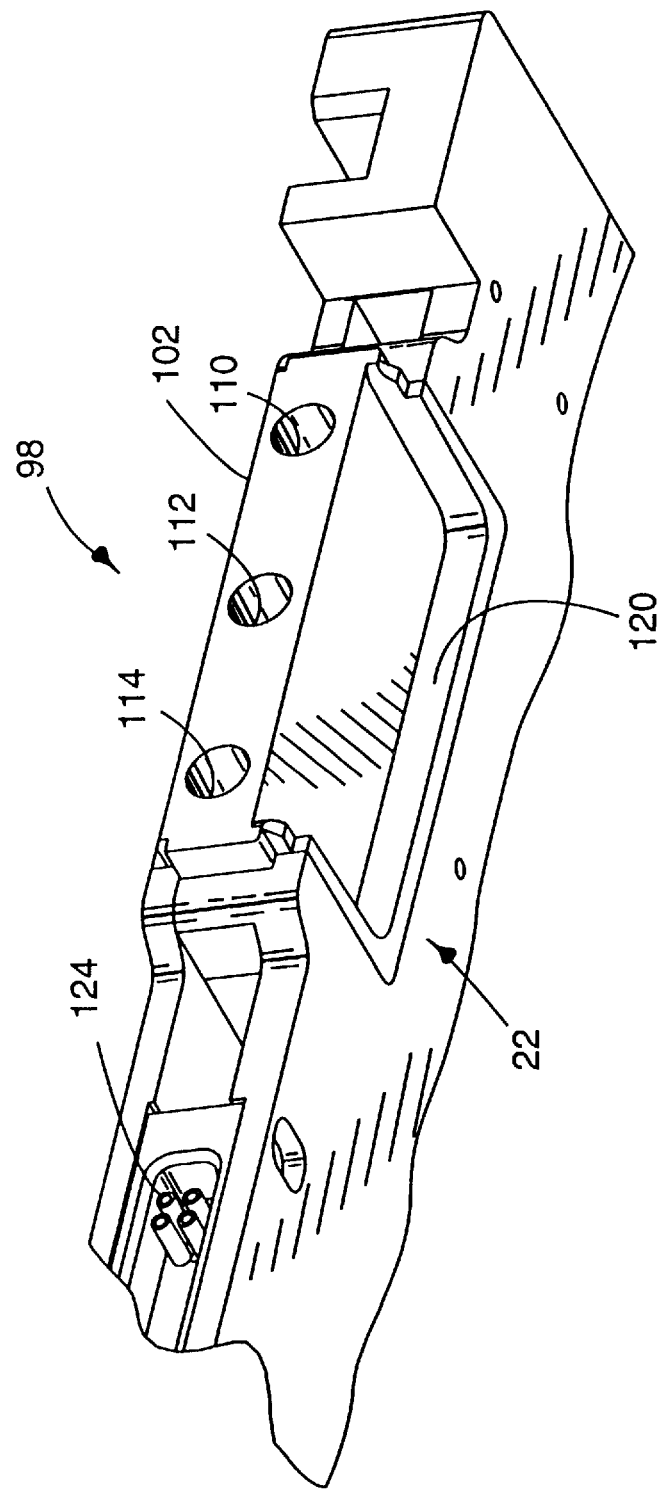
FIG. 13 is a lower perspective view of the electrical interface structure of FIG. 11 showing a groove connection.

The electrical interface structure 98 also includes a keyway which facilitates proper alignment of the pins entering the receiving holes 110, 112, 114, as shown in FIG. 13. The keyway comprises a groove connection 120 designed for guiding a matching tongue on a portion of the mating power source 100 in the reader 18 and the mating recharger 20.

To prevent user contact with the electrical interface structure 98, the cassette 10 can include a protective plug 121, as shown in FIG. 2. The protective plug 121 can be attached to the electrical interface structure 98. If used, the protective plug 121 is to be removed before inserting the cassette 10 into the reader 18. The protective plug 121 can be constructed of a material such as polycarbonate.

For the electronic connection to the reader, the cassette 10 also includes an electronic interface structure 122 as shown in FIGS. 1, 2, and 4. As previously noted, the electronic interface structure 122 allows for data acquisition from or reading of the image by the reader 18. As shown in FIG. 11, the electronic interface structure 122 is a data acquisition connector one embodiment of which includes an electronic multi-pin connector 124, which is connected to a flex circuit 126, which, in turn, is connected to the medium 12. The connection of the multi-pin connector 124 with a reader data acquisition connector 128, shown in FIG. 1, completes the connection for data acquisition by the reader 18. U.S. patent application Ser. No. 08/221,191, identified as 3M Docket No. 50134USA1A and earlier incorporated by reference, discloses this connection in greater detail.

Because the pins of the multi-pin connector 124 is shorted to ground potential during the medium-exposing step C2 (U.S. Pat. No. 5,268,569 and U.S. patent application Ser. No. 07/163266), the cassette also includes a shorting plug 129, as shown in FIGS. 2 and 4. The shorting plug 129 can be constructed of a dielectric material, such as polycarbonate, and include electrical contacts (not shown) which mate with the multi-pin connector 124 and short out the electronic interface structure 122 to the ground termination 48. Like the protective plug 121 covering the electrical interface structure 98, the shorting plug 129 is removed before inserting the cassette 10 into the reader 18. While the two plugs 121, 129 are shown as separate components, they could be constructed as a single component.

Figure 14:
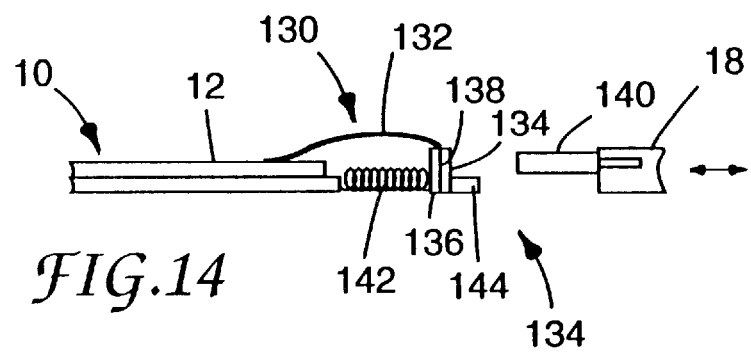
FIG. 14 is an alternate embodiment of the electronic interface structure of FIG. 11.

An alternate embodiment of the electronic interface structure 130, shown in FIG. 14, is intended for high density electronic connections between the medium 12 and the reader 18. The electronic interface structure 130 includes a flex circuit 132 which is bonded on one end to the photoreceptive medium 12 with conductive adhesive, and bonded on the other to a connector member 134, which includes a stiffening member 136. The connector member 134 is a WB Type Connector made by Fujipoly. A reader connecting member 140 contacts a portion of the connector member 134 to make the connection with the photoreceptive medium 12. Secure connection is maintained because the connector member 134 is biased toward the reader connecting member 140 by a biasing means 142. When the cassette 10 is not within the reader 18, a shorting bar 144, connected to a portion of the connector member 134, can contact the shorting plug 129 previously noted.

After the cassette 10 is electrically and electronically connected to the reader 18, the reader 18 opens the cassette cover 23, scans, and reconditions the photoreceptive medium 12. The reader 18 includes a male cover-opening pin (shown in co-pending U.S. patent application Ser. No. 08/221,191, identified as 3M Docket No. 50134USA1A) which enters a female cover-opening pin 150, shown in FIG. 2, and swings the cover 23 open.

Figure 15:
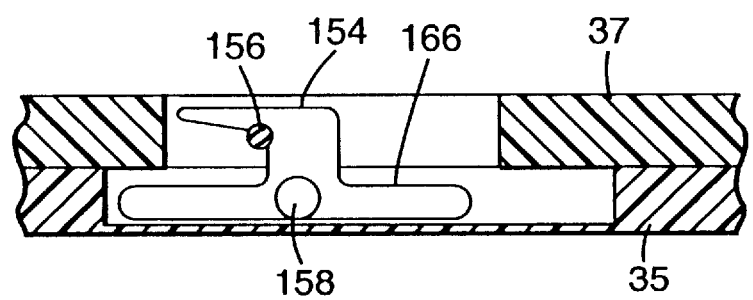
FIG. 15 is a side view of a portion of the secure cover-latching mechanism in a latched position.
Figure 16:
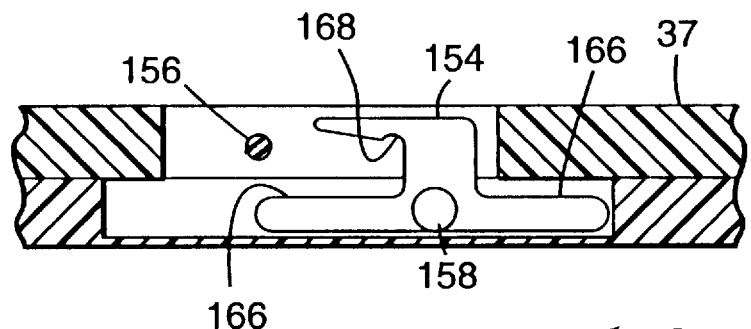
FIG. 16 is a side view of part of the secure cover-latching mechanism analogous to that shown in FIG. 15, but in an unlatched position.

However, the cassette 10 also includes a secure cover-latching mechanism 152, as shown in FIGS. 15 and 16, which must be disengaged before the cover 23 can be opened. The latching mechanism 152 is intended to prevent inadvertent opening of the cover 23 and to secure the cover 23 snugly against the base 22. As shown in FIG. 2, one embodiment of the secure cover-latching mechanism 152 includes at least one beveled hook 154 slidably mounted and partially enclosed within the base 22 and a corresponding cover-latching pin 156 within the cover 23. Although the secure cover-latching mechanism 152 is shown with two hooks 154 and pins 156, one hook and pin also serves the purpose. Conversely, several hooks 154 and pins 156 could be included for larger cassettes, or simply for greater security. The hooks 154 can be constructed of metal.

In FIG. 16, the beveled hook 154 is shown disengaged from the cover-latching pin 156, thereby allowing the reader 18 to lift the cover 23 and scan the medium 12. To allow engagement, the beveled hook 154 includes a center hole 158 which corresponds to a reader latching pin (shown in co-pending U.S. patent application Ser. No. 08/221,191, identified as 3M Docket No. 50134USA1A), and the base 22 includes a hook access slot 160, as shown in FIG. 2, for the reader latching pin. As a result, the reader 18 can insert the reader latching pin into the center hole 158 and slide the beveled hook 154 within a base groove 162 toward the aligned cover-latching pin 156.

The cover-latching pin 156 is aligned with and makes first contact with a ramp 164 on the hook 154. Because the hook slide portion 166 is confined within the base groove 162 preventing vertical movement of the hook 154 within the base 22, the sliding hook 154 pulls the cover 23 snugly against the base 22 as the hook 154 slides further on the ramp 164 over the pin 156. When completely engaged, as shown in FIG. 15, the pin 156 drops into a hook detent 168 which prevents the hook 154 from sliding off the pin 156. Re-engagement of the hooks 154 and pins 156, after the reader 18 scans the medium 12 and acquires the data through the electronic interface structure 122, completes the image-reading step C4.

To begin the cassette-recharging step C5, the electrical interface structure 98 is connected to the recharger 20, as shown in FIG. 1. As shown in FIG. 12, the pad connectors 104, 106, 108 mate with the recharger pins 170, 171, 172, respectively. As previously noted and shown in FIG. 4, the pad connectors 104, 106, 108 are also electrically connected to the switch structure 32. Therefore, when the recharger pins 170, 171, 172 are mated with the pad connectors 104, 106, 108, respectively, the recharger sends a recharging current through pin 170 which recharges the power storage device 28, as shown in the circuit schematic in FIG. 4. Recharger pins 171 and 172, being electrically connected and grounded, ground the medium 12 during the recharging step C5 to prevent leaving a potential across the photoreceptive medium 12.

After the power storage device 28 is fully recharged, the user can attach the protective plug 121 to the electrical interface structure 98 and the shorting plug 129 to the electronic interface structure cover 122. This completes the cassette-recharging step C5 and prepares the cassette 10 for another cycle C, as shown in FIG. 1.

The cycle C and related structure described above represents only one embodiment of the invention. Other related embodiments are also contemplated within this invention.

We claim:

1. A cassette adapted for use in an electronic radiographic imaging system having electronic components, comprising:

a photoreceptive medium;

a frame for supporting the photoreceptive medium and for protecting the photoreceptive medium from ambient actinic radiation;

at least one power storage device housed and supported within the frame, the at least one power storage device being electrically connectable to the photoreceptive medium, wherein the at least one power storage device applies a voltage across the photoreceptive medium when connected to the photoreceptive medium enabling the photoreceptive medium to capture a radiographic image; and an electronic interface structure for electronically connecting the photoreceptive medium to the electronic components external of the cassette to enable the electronic components to acquire image information corresponding to the radiographic image from the photoreceptive medium.

2. The cassette of claim 1 further adapted for use in an electronic radiographic imaging system having a power source and a power storage recharger and further comprising an electrical interface structure configured to electrically connect the photoreceptive medium to the power source and the power storage recharger.

3. The cassette of claim 1 in which the frame comprises a base having an opening and an openable cover covering the opening.

4. The cassette of claim 1 further comprising means for actively reducing the voltage applied across the photoreceptive medium to a lower maintenance voltage and applying the lower maintenance voltage across the photoreceptive medium.

5. The cassette of claim 1, further comprising means for capturing the radiographic image without the cassette being connected to other equipment.

6. The cassette of claim 1, further comprising means for increasing the period of time for which the photoreceptive medium can store the radiographic image, wherein the increasing means comprises means for actively reducing the voltage to a lower maintenance voltage and applying the lower maintenance voltage across the photoreceptive medium.

7. The cassette of claim 1, further comprising means for discharging the power storage device when the photoreceptive medium is uncovered.

8. The cassette of claim 1, further comprising means for discharging the photoreceptive medium when the photoreceptive medium is uncovered.

9. The cassette of claim 8, further comprising means for preventing the discharging of the photoreceptive medium when the photoreceptive medium is uncovered and when the photoreceptive medium is connected to the electronic components.

10. A cassette adapted for use in an electronic radiographic imaging system having electronic components external of the cassette, comprising:

a photoreceptive medium;

a frame for supporting and protecting the photoreceptive medium from ambient actinic radiation;

at least one power storage device housed and supported within the frame, the at least one power storage device being electrically connectable to the photoreceptive medium;

an electronic interface structure for electronically connecting the photoreceptive medium to the electronic components external of the cassette; and means for actively reducing an initial exposure voltage applied to the photoreceptive medium to a lower maintenance voltage and applying the lower voltage across the photoreceptive medium.

11. The cassette of claim 10 in which the at least one power storage device comprises at least one capacitor.

12. The cassette of claim 10 in which the at least one power storage device comprises a plurality of capacitors.

13. The cassette of claim 12 in which the reducing means comprises a mechanism for discharging at least one of the capacitors.

14. The cassette of claim 10 further comprising an electrical interface structure configured to electrically connect the cassette to an external power source within the electronic radiographic imaging system.

15. The cassette of claim 14 in which the electrical interface structure has a groove connection for receiving a matching tongue from an external power source.

16. The cassette of claim 10 in which the electronic interface structure comprises a data acquisition connector housed and supported within the frame, the data acquisition connector being connected by a flexible circuit and conductive adhesive which is attached to the photoreceptive medium.

17. The cassette of claim 10 in which the electronic interface structure comprises a plurality of electronic connectors.

18. The cassette of claim 10 in which the means for actively reducing the initial exposure voltage comprises a switch structure electrically connected between the at least one power storage device and the photoreceptive medium to control voltage applied to the photoreceptive medium so that when the switch structure is in a first configuration, the initial exposure voltage is applied to the photoreceptive medium, and when the switch structure is in a second configuration, the lower maintenance voltage is applied to the photoreceptive medium.

19. The cassette of claim 18 in which the switch structure comprises a plurality of switches.

20. The cassette of claim 19 in which the switch structure comprises a first switch, a second switch, and a switch interlock mechanism controlling a switch actuator mechanism; the switch interlock mechanism permitting the second switch to be actuated only after the first switch is actuated.

21. The cassette of claim 20 further comprising actuator tabs which keeps the first switch actuated and the second switch actuated until reset by the electronic radiographic imaging system.

22. The cassette of claim 10 in which the frame comprises a base and an openable cover, the cover comprising structure to permit opening and closing by the radiographic imaging system.

23. The cassette of claim 22 in which the opening and closing structure comprises a receiving member mounted on the cover suitable for receiving an engaging member of the radiographic imaging system.

24. The cassette of claim 22 in which the frame comprises a secure latching mechanism to prevent inadvertent opening of the cover.

25. The cassette of claim 24 in which the secure latching mechanism comprises a beveled hook mounted within the base and aligned to engage a corresponding pin within the cover.

26. The cassette of claim 22 further comprising a light seal between the cover and the frame.

27. The cassette of claim 26 in which the light seal comprises a ridge on the cassette base arranged for interlocking relation with a ridge on the cassette cover.

28. The cassette of claim 22 further comprising a foreign material exclusion seal between the cover and the frame.

29. The cassette of claim 22 in which a space is maintained between the cover and the photoreceptive medium.

30. The cassette of claim 22 in which a portion of the frame is radiolucent.

31. The cassette of claim 22 in which a portion of the frame is a composite material.

32. The cassette of claim 22 in which the cassette further comprises an electrical insulation structure which isolates the cover from the voltage within the cassette.

33. An apparatus for capturing and storing a radiographic image, comprising:
   a photoreceptive medium;
   means for applying a first voltage across the photoreceptive medium when the photoreceptive medium captures the radiographic image; and
   means for actively reducing the first voltage to a second voltage and applying the second voltage across the photoreceptive medium after the photoreceptive medium has captured the radiographic image.

34. A method for capturing an image in a photoreceptive medium and increasing the period of time for which the photoreceptive medium can store the image, comprising the steps of:
   applying a first voltage across the photoreceptive medium when the photoreceptive medium captures the image; and
   actively reducing the first voltage to a second voltage and applying the second voltage across the photoreceptive medium after the photoreceptive medium has captured the image.

35. The method of claim 34, wherein the first voltage is greater than 2000 volts and wherein the second voltage is greater than 1500 volts.

36. The method of claim 34, wherein the first voltage is greater than 4000 volts.

37. The method of claim 34, wherein the first voltage is greater than 8000 volts.

38. A cassette adapted for use in an electronic radiographic imaging system having electronic components, comprising:
   an enclosure;
   a photoreceptive medium for capturing a radiographic image, wherein the photoreceptive medium is positionable within the enclosure;
   at least one power storage device electrically connectable to the photoreceptive medium; and
   an electronic interface structure for electronically connecting the photoreceptive medium to the electronic components to enable the electronic components to acquire image information corresponding to the radiographic image from the photoreceptive medium.

39. A cassette adapted for use in an electronic radiographic imaging system having electronic components, comprising:
   an enclosure;
   a photoreceptive medium for capturing a radiographic image, wherein the photoreceptive medium is positionable within the enclosure;
   at least one power storage device electrically connectable to the photoreceptive medium, wherein the at least one power storage device applies a voltage across the photoreceptive medium when connected to the photoreceptive medium; and
   means for discharging at least one of the photoreceptive medium and the power storage device when the photoreceptive medium is at least partially unenclosed.

* * * * *

UNITED STATES PATENT AND TRADEMARK OFFICE
CERTIFICATE OF CORRECTION

PATENT NO.: 5,773,839

DATED: June 30, 1998

INVENTOR(S): Krepel et al.

It is certified that error appears in the above-identified patent and that said Letters Patent is hereby corrected as shown below:

On the title page, item[56] the following should be added:

| | | |
|---|---|---|
| --5,042,662 | 08/91 | Mirlieb et al. |
| 5,001,582 | 03/91 | Numasaki |
| 4,989,038 | 01/91 | Kobayashi et al. |
| 4,903,286 | 02/90 | Niedospial et al. |
| 4,889,989 | 12/89 | Yoshimura et al. |
| 4,760,641 | 08/88 | Gandolfo |
| 4,621,272 | 11/86 | Toriumi et al.-- |

Signed and Sealed this

Thirteenth Day of February, 2001

Attest:

NICHOLAS P. GODICI

Attesting Officer    Acting Director of the United States Patent and Trademark Office